United States Patent
Kimura

(10) Patent No.: US 12,253,907 B2
(45) Date of Patent: Mar. 18, 2025

(54) MONITORING-DATA PROCESSING METHOD AND SYSTEM

(71) Applicant: DENSO CORPORATION, Kariya (JP)

(72) Inventor: Masao Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 329 days.

(21) Appl. No.: 17/650,638

(22) Filed: Feb. 10, 2022

(65) Prior Publication Data

US 2022/0261307 A1  Aug. 18, 2022

(30) Foreign Application Priority Data

Feb. 12, 2021  (JP) .................... 2021-020932

(51) Int. Cl.
 *G06F 11/00* (2006.01)
 *G06F 1/24* (2006.01)
 *G06F 11/07* (2006.01)

(52) U.S. Cl.
 CPC .......... *G06F 11/0793* (2013.01); *G06F 1/24* (2013.01); *G06F 11/0721* (2013.01)

(58) Field of Classification Search
 CPC .......... G06F 11/0793; G06F 11/0721; G06F 11/1441; G06F 11/3058; G06F 11/3062; G06F 11/3065; G06F 1/24
 See application file for complete search history.

(56) References Cited

U.S. PATENT DOCUMENTS

| | | |
|---|---|---|
| 2015/0278001 A1 | 10/2015 | Tohyama |
| 2020/0207374 A1* | 7/2020 | Li ................... G06F 11/3013 |
| 2020/0226017 A1* | 7/2020 | Hayashi ............ G06F 11/076 |
| 2020/0304712 A1 | 9/2020 | Kimura |
| 2022/0017107 A1 | 1/2022 | Shinoda et al. |

FOREIGN PATENT DOCUMENTS

| | | | |
|---|---|---|---|
| JP | 2013-003985 A | 1/2013 | |
| WO | WO-2015025370 A1 * | 2/2015 | ............. G05B 15/02 |

* cited by examiner

*Primary Examiner* — Katherine Lin
(74) *Attorney, Agent, or Firm* — Maschoff Brennan

(57) ABSTRACT

A monitoring-data processing method is executable by at least one processor included in a monitoring-data processing system that includes a control apparatus that retrieves monitoring data indicative of a surrounding of a vehicle. The monitoring-data processing method includes performing processing of the monitoring data retrieved by the control apparatus, and determining whether there is a malfunction in the monitoring-data processing system. The monitoring-data processing method additionally includes performing, in response to a malfunction determination that there is a malfunction in the monitoring-data processing system, a task of (i) switching the control apparatus to be in a reset state and thereafter (ii) restarting the control apparatus while holding data indicative of the malfunction in an internal storage of the control apparatus.

11 Claims, 5 Drawing Sheets

| | RESET TERMINAL |
|---|---|
| SW ON | LOW (GND) |
| SW OFF | HIGH (Vcc) |

MONITORING-DATA PROCESSING METHOD AND SYSTEM

CROSS-REFERENCE TO RELATED APPLICATION

This application is based on and claims the benefit of priority from earlier Japanese Patent Application No. 2021-020932 filed on Feb. 12, 2021, the entire disclosure of which is incorporated herein by reference.

TECHNICAL FIELD

The present disclosure relates to a monitoring-data processing method and a monitoring-data processing system.

BACKGROUND

Known power management apparatuses for a vehicular camera module are configured to monitor a controller for the vehicular camera module, and reset the controller in response to determine that the controller has malfunctioned.

SUMMARY

A monitoring-data processing system according to one aspect of the present disclosure includes a monitor control apparatus that includes a first controller that retrieves monitoring data indicative of surroundings of a vehicle captured by a surroundings monitor. The first controller writes, in response to a malfunction determination that there is a malfunction in at least one of the monitor control apparatus, the surroundings monitor, and a power supply apparatus, malfunction data indicative of the malfunction into an internal register provided in the monitor control apparatus. The first controller performs a reset task of switching the monitor control apparatus to be in a reset state in response to the malfunction determination while holding the malfunction data in the internal register.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

Figure 1:
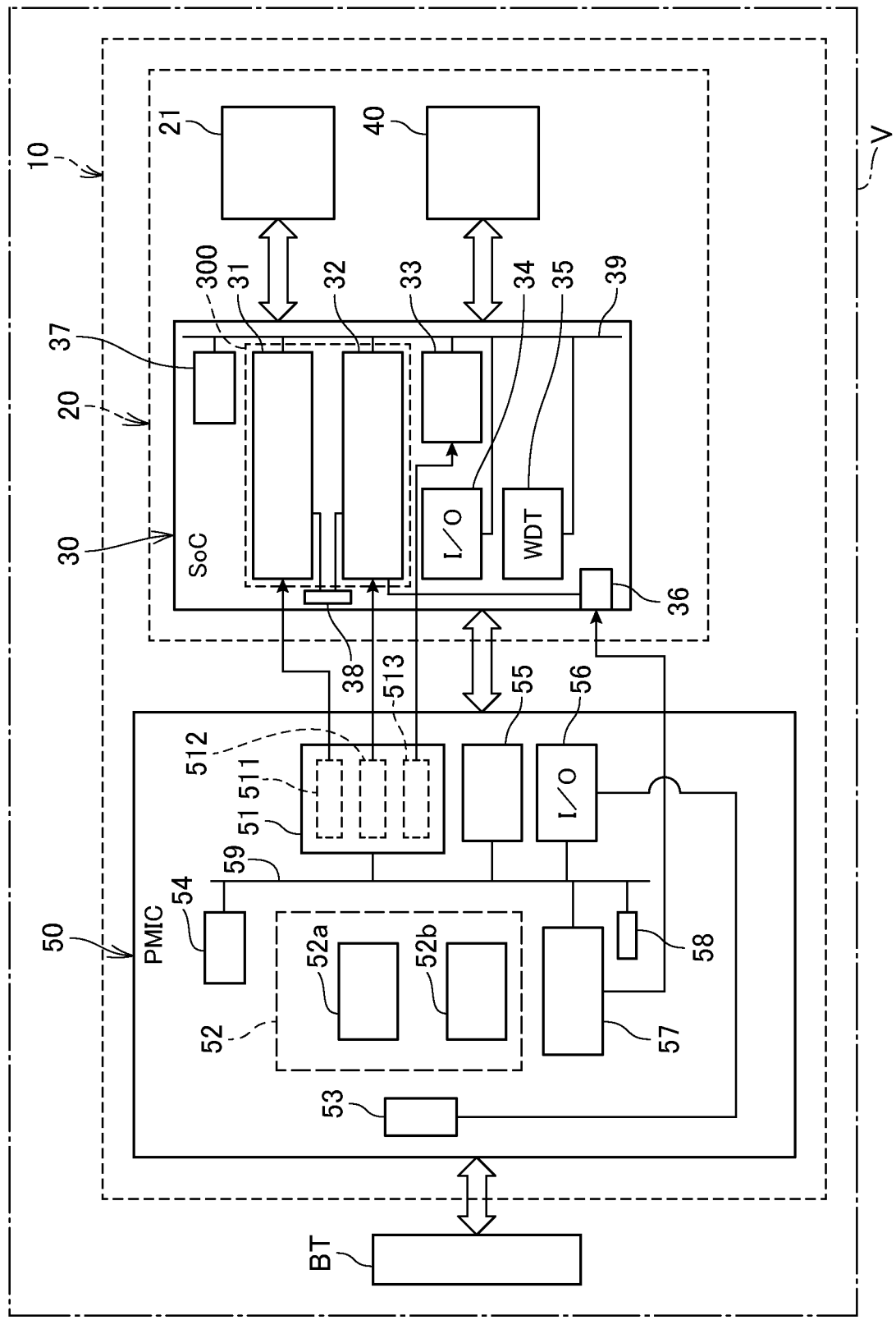
FIG. 1 is a block diagram illustrating a schematic configuration of a surroundings monitor system according to an exemplary embodiment of the present disclosure.

Japanese Patent Application Publication No. 2020-156222 discloses an example of such a power management apparatus for a vehicular camera module, which monitors a controller for the vehicular camera module, and resets the controller in response to determine that the controller has malfunctioned.

The patent publication describes that the power management apparatus has a reset terminal, and the power supply apparatus transmits a reset control signal from the reset terminal to the controller for controlling resetting of the controller. The patent publication additionally describes that the power management apparatus includes a register that stores information indicative a state of the reset terminal.

Recently, a surroundings monitor system for example using such a vehicular camera module is installed in a vehicle, such as an autonomous vehicle. Such a surroundings monitor system includes a surroundings monitor device, such as a vehicular camera module, a power supply unit for powering the surroundings monitor device, and a controller. The surroundings monitor device, which is powered by the power supply unit, monitors the surrounding of the vehicle, and outputs, to the controller, information indicative of the monitored surrounding. The controller performs, based on the information outputted from the surroundings monitor device, assistance of driver's maneuvers of the vehicle or autonomous driving of the vehicle.

A malfunction in the surroundings monitor device or the power supply unit may cause the surroundings monitor device to output, to the controller, erroneous information about the surrounding of the vehicle. The erroneous information may result in erroneous assistance of driver's maneuvers or erroneous autonomous driving of the vehicle.

For addressing the problem, the inventor has earnestly considered measures, and has found a first measure that resets the controller to thereby restart the controller in response to detection of the malfunction. This first measure however may make it difficult to detect the malfunction after the restart of the controller.

The inventor also has found a second measure that stores data related to the malfunction in an external memory or a register of the power supply unit in response to detection of the malfunction, and thereafter resets the controller to thereby restart the controller. This second measure however may result in a longer time being required for the controller to restart itself, resulting in an increased possibility of the surroundings monitor device outputting erroneous information about the surrounding of the vehicle to another device, such as a vehicular control device. The outputting of the erroneous information about the surrounding of the vehicle to the vehicular control device may result in an increase in a possibility of the vehicular control device performing a malfunction operation, such as erroneous sudden braking, of the vehicle.

In view of the circumstances set forth above, the present disclosure seeks to provide a monitoring-data processing system including a surroundings monitor apparatus, which is capable of reliably detecting the occurrence of a malfunction in the monitoring-data processing system while reducing a possibility that the surroundings monitor apparatus outputs erroneous information.

The present disclosure also seeks to provide a monitoring-data processing method executable by at least one processor of a monitoring-data processing system, which is capable of reliably detecting the occurrence of a malfunction in the monitoring-data processing system while reducing a possibility of erroneous information being outputted as monitoring data to another device.

A first exemplary aspect of the present disclosure provides a monitoring-data processing system. The monitoring-data processing system includes a monitor control apparatus that includes a first controller. The first controller is configured to retrieve monitoring data indicative of surroundings of a vehicle captured by a surroundings monitor. The monitoring-data processing system includes a power supply apparatus including a second controller and configured to power the monitor control apparatus. At least the monitor control apparatus includes an internal register provided therein.

At least one of the first controller and the second controller is configured to determine whether there is a malfunction in at least one of the monitor control apparatus, the surroundings monitor, and the power supply apparatus.

The first controller is configured to write, in response to a malfunction determination that there is a malfunction in at least one of the monitor control apparatus, the surroundings monitor, and the power supply apparatus, malfunction data indicative of the malfunction into the internal register. The first controller is configured to perform a reset task of switching the monitor control apparatus to be in a reset state in response to the malfunction determination while holding the malfunction data in the internal register.

In the monitoring-data processing system according to the first exemplary aspect of the present disclosure, the first controller is configured to perform the reset task of switching the monitor control apparatus to be in the reset state in response to the malfunction determination that there is a malfunction in at least one of the monitor control apparatus, the surroundings monitor, and the power supply apparatus while holding the malfunction data in the internal register.

This configuration therefore makes it possible to reliably detect the occurrence of the malfunction even after restarting of the monitor control apparatus.

Specifically, in response to determination that there is a malfunction in at least one of the monitor control apparatus, the surroundings monitor, and the power supply apparatus, the first controller of the monitor control apparatus is configured to store, in the internal register, the malfunction data indicative of the occurred malfunction.

This configuration reduces a time required for the first controller to restart the monitor control apparatus as compared with a case where the first controller stores the malfunction data in an external memory of the monitor control apparatus, and thereafter restarts the monitor control apparatus. This therefore reduces a possibility of the surroundings monitor outputting erroneous information about the surrounding of the vehicle. The outputting of the erroneous information about the surrounding of the vehicle would result in a possibility of a malfunction operation, such as erroneous sudden braking, of the vehicle occurring.

Accordingly, the monitoring-data processing system according to the first exemplary aspect makes it possible to reliably diagnose that a malfunction has occurred therein while reducing a possibility of the surroundings monitor outputting erroneous information about the surrounding of the vehicle.

A second exemplary aspect of the present disclosure provides a monitoring-data processing method executable by at least one processor included in a monitoring-data processing system that includes a control apparatus that retrieves monitoring data indicative of surroundings of a vehicle. The monitoring-data processing method includes performing processing of the monitoring data retrieved by the control apparatus, and determining whether there is a malfunction in the monitoring-data processing system. The monitoring-data processing method additionally includes performing, in response to a malfunction determination that there is a malfunction in the monitoring-data processing system, a task of (i) switching the control apparatus to be in a reset state and thereafter (ii) restarting the control apparatus while holding data indicative of the malfunction in an internal storage of the control apparatus.

The monitoring-data processing method according to the second exemplary aspect of the present disclosure reduces a time required for restarting of the control apparatus as compared with a case where a comparative method stores malfunction information in an external memory of the control apparatus and thereafter restarts itself.

This therefore reliably diagnoses whether a malfunction has occurred in the monitoring-data processing system while reducing a possibility of erroneous information about the surrounding of the vehicle being outputted from the control apparatus to another device, such as a controller for the vehicle. The outputting of the erroneous information about the surrounding of the vehicle would result in a possibility of the controller for the vehicle performing a malfunction operation, such as erroneous sudden braking, of the vehicle.

Next, the following describes an exemplary embodiment of the present disclosure with reference to the accompanying drawings.

The following exemplary embodiment describes a surroundings monitor system 10 to which a monitoring-data processing system according to one aspect of the present disclosure is applied with reference to FIGS. 1 to 9.

The surroundings monitor system 10 is installed in a vehicle V for assistance of driver's maneuvering of a vehicle and/or autonomous driving of the vehicle.

Referring to FIG. 1, the surroundings monitor system 10 includes a surroundings monitor apparatus 20 and a power management apparatus, which serves as, for example, a power supply apparatus, 50. The surroundings monitor apparatus 20 is configured to monitor the surrounding of the vehicle V. Monitoring of the surrounding of a vehicle or other similar expressions in the present disclosure represents at least one of all directions from the vehicle; the directions include a forward direction of the vehicle, diagonally forward left and right directions of the vehicle, side direction of the vehicle, diagonally backward left and right directions of the vehicle, and a backward direction of the vehicle.

The surroundings monitor apparatus 20 is designed as a camera module comprised of a vehicular camera 21, which is an example of a surroundings monitor, for capturing images of the surrounding of the vehicle V. The vehicular camera 21 serves as, for example, a sensor for monitoring the surrounding of the vehicle V. Specifically, the vehicular camera 21 is mounted in a compartment of the vehicle V to face a windshield of the vehicle V, and is configured to capture an image of a directional view of the vehicle V, such as a front view, based on light incident from the corresponding direction of the directional view, such as the front of the vehicle V.

The surroundings monitor apparatus 20 also includes a system 30 on a chip, which will be referred to as an SOC 30, and a storage 40. The SOC 30 of the exemplary embodiment serves as, for example, a monitor control apparatus of the surroundings monitor apparatus 20.

The SOC 30 is designed as an integrated circuit comprised of a semiconductor chip and various functional circuits, which include at least one processor and at least one memory, such as a non-transitory storage medium, mounted to the semiconductor chip.

Specifically, the SOC 30 includes, for example, a single unillustrated semiconductor chip. The SOC 30 also includes a controller 300 comprised of an image processor 31 and a control processor 32, a first malfunction register 33, a first input/output (I/O) interface 34, a watchdog timer (WDT) 35, a reset terminal 36, a storage 37, a voltage sensor 38, and a bus 39; the components 31 to 39 are mounted in or on the semiconductor chip. The storage 37 of the SOC 30 is comprised of at least one nonvolatile storage medium.

The components 31 to 35, 37, and 38 are communicably connected to one another via the bus 39, and the reset terminal 36 is, for example, directly connected to the controller 300, but can be indirectly connected to the controller 300.

The controller 300 constitutes the image processor 31 and the control processor 32. One or both of the image processor 31 and the control processor 32 can serve as the controller 300. One of the processors 31 and 32 can serve as the controller 300 for performing functions of each of processors 31 and 32.

The image processor 31 serves as, for example, a surroundings monitor for monitoring the surrounding of the vehicle V in accordance with, for example, images captured by and outputted from the vehicular camera 21. Specifically, the image processor 31 is configured to monitor the surrounding of the vehicle V based on the images outputted from the vehicular camera 21 and/or information extracted from the images outputted from the vehicular camera 21.

In particular, the image processor 31 is activated to start execution of the monitor operation based on first electrical power having, for example, a predetermined first voltage, supplied from the power management apparatus 50. That is, the image processor 31 is configured to operate at an operating voltage based on the predetermined first voltage.

The control processor 32 is comprised of, for example, logical circuits, registers, and one or more memories.

The storage 37 stores various programs, i.e., program codes, that enable the control processor 32 to perform various tasks that include, for example, (i) a first control task of controlling operations of the vehicular camera 21, (ii) a second control task of controlling operations of the image processor 31, (iii) a third control task of controlling the first malfunction register 33, (iv) a fourth control task of controlling operations of the WDT 35, and (v) a fifth task of controlling the storage 37.

In particular, additional various tasks to be carried out by the controller 300 include, for example, a first diagnostic task of communicating with the components 21, 31 to 38, and 40 installed in the surroundings monitor apparatus 20 to thereby diagnose whether there is a malfunction in the surroundings monitor apparatus 20, i.e., a malfunction in at least one of the components 21, 31 to 38, and 40 installed in the surroundings monitor apparatus 20. The first diagnostic task of the controller 300 also writes, into the first malfunction register 33, first malfunction data, for example, N-bit flag data (N is a positive integer more than or equal to 2), including information on the malfunctioning at least one of the components of the surroundings monitor apparatus 20.

Malfunctions that can occur in the surroundings monitor apparatus 20 include, for example, a logic error for at least one of the image processor 31 and the control processor 32, and an anomaly in at least one of the storages 37 and 40.

Specifically, the first malfunction data (N-bit flag data) is comprised of N bits, and each of the N bits is allocated to a corresponding one of the components of the surroundings monitor apparatus 20, such as the image processor 31 and the vehicular camera 21. That is, all N bits of the first malfunction data are set to 0, and if determining that the image processor 31 has malfunctioned, the first diagnostic task of the controller 300 changes a selected one of the N bits of the first malfunction data, which corresponds to the image processor 31, from 0 to 1, and writes the first malfunction data into the first malfunction register 33.

Each of the N bits may be allocated to a corresponding one of types of malfunctions in a corresponding one of the components of the surroundings monitor apparatus 20.

In particular, the control processor 32 is activated to start execution of the various tasks based on second electrical power having, for example, a predetermined second voltage, supplied from the power management apparatus 50. That is, the control processor 32 is configured to operate at an operating voltage based on the predetermined second voltage.

The first malfunction register 33 installed in the SOC 30 is configured to store and hold the first malfunction data when the first malfunction data is written thereinto by the controller 300. The first malfunction register 33 may be provided as a dedicated register or a general-purpose register. The first malfunction register 33 is comprised of, for example, at least one of various types of volatile memories.

The first I/O interface 34 serves as an interface that enables at least one component of the SOC 30 and the other apparatuses, such as the power management apparatus 50 and the vehicular camera 21, to communicate with one another therethrough. For example, the images captured by and outputted from the vehicular camera 21 are inputted to the image processor 31 of the controller 300 of the SOC 30 through the first I/O interface 34. In addition, the controller 300 of the SOC 30 reads the first malfunction data stored in the first malfunction register 33, and outputs the first malfunction data to the storage 40.

The WDT 35 is configured to receive pulses periodically outputted from each of the image processor 31 and the control processor 32 to thereby monitor whether each of the image processor 31 and the control processor 32 is operating normally in accordance with the received pulses from the corresponding one of the image processor 31 and the control processor 32.

That is, the WDT 35 is configured to continuously or periodically output, to the power management apparatus 50 through the first I/O interface 34, a normal signal representing that the SOC 30, i.e., each of the image processor 31 and the control processor 32, is operating normally as long as the WDT 35 receives the pulses periodically outputted from each of the image processor 31 and the control processor 32. This enables the WDT 35 to monitor whether the SOC 30, i.e., each of the image processor 31 and the control processor 32, is operating normally.

If a time that has elapsed since the last pulse outputted from, for example, the image processor 31 was received is longer than a predetermined WDT threshold, the WDT 35 is configured to stop outputting of the normal signal to the power management apparatus 50 through the first I/O interface 34.

The reset terminal 36 is connected to a reset controller 57 of the power management apparatus 50 described later via a signal line. To the reset terminal 36, a reset request signal indicative of a request for resetting of the SOC 30 is inputted from the power management apparatus 50. The controller 300 of the SOC 30 performs a reset task, i.e., an initialization task, for the SOC 30.

For example, the reset task of the controller 300 initializes the image processor 31, the control processor 32, the first I/O interface 34, and the WDT 35 other than the first malfunction register 33 and the storage 37 to thereby switch the components 31, 32, 34, and 35 to be in a reset state. In the reset state, the components 31, 32, 34, and 35 are for example shutdown.

The voltage sensor 38 is configured to measure the level of the individual operating voltage of each of the image processor 31 and the control processor 32, and output, through the first I/O interface 34, the power management apparatus 50.

The storage 40 is provided outside the SOC 30. The storage 40 is comprised of a nonvolatile memory. The storage 40 is powered by the power management apparatus 50. That is, the power management apparatus 50 is configured to supply electrical power to the storage 40 independently from the power supply to the SOC 30.

The power management apparatus 50 is designed as a power-supply module for supplying electrical power to the image processor 31, the control processor 32, or other components included in the SOC 30 using a battery BT installed in the vehicle V. For example, the power management apparatus 50 is comprised of a power management IC (PMIC).

Specifically, the power management apparatus 50 includes, for example, a power supply module 51, a power management controller 52, a voltage sensor 53, a memory 54, a second malfunction register 55, a second input/output (I/O) interface 56, the reset controller 57, a temperature sensor 58, and a bus 59. The memory 54 of the power management apparatus 50 is comprised of at least one nonvolatile storage medium.

Each component included in the power management apparatus 50 is configured to operate based on an individual operating voltage; the individual operating voltage of each component included in the power management apparatus 50 is generated based on a terminal voltage across the battery BT as an operating voltage thereof.

The components 51, 52, and 54 to 58 are communicably connected to one another via the bus 59.

The power supply module 51 includes a first power supply unit 511, a second power supply unit 512, and a third power supply unit 513.

The first power supply unit 511 is configured to generate, based on a terminal voltage across the battery BT, the first electrical power having the predetermined first voltage, and output the first electrical power to the image processor 31 under control of the power management controller 52.

The second power supply unit 512 is configured to generate, based on the terminal voltage across the battery BT, the second electrical power having the predetermined second voltage, and output the second electrical power to the control processor 32 under control of the power management controller 52.

The third power supply unit 513 is configured to generate, based on the terminal voltage across the battery BT, third electrical power having a predetermined third voltage, and output the third electrical power to the first malfunction register 33 under control of the power management controller 52. This enables the first malfunction register 33 to perform the storing and holding function.

The temperature sensor 58 is configured to measure a value of the temperature of the power management apparatus 50, and output, to the power management controller 52, the measured value of the temperature of the power management apparatus 50.

The voltage sensor 53 is configured to measure the level of the terminal voltage across the battery BT, and output, through the second I/O interface 56, the power management controller 52.

As described above, the image processor 31 is configured to operate at the operating voltage based on the predetermined first voltage, and the control processor 32 is configured to operate at the operating voltage based on the predetermined second voltage. Each of the predetermined first and second voltages may be identical to the individual operating voltage of the corresponding one of the image processor 31 and control processor 32 or different therefrom.

The memory 54 stores various programs, i.e., program instructions, that enable the power management controller 52 to perform various tasks that include, for example, a first control task of controlling operations of the power supply module 51, a second control task of controlling operations of the reset controller 57, and a third control task of controlling the second malfunction register 55.

In particular, at least one of the programs stored in the memory 54 causes the power management controller 52 to serve as a power management processor 52a to
(i) Instruct the first power supply unit 511 to output, at each of controlled first times, the first electrical power to the image processor 31
(ii) Instruct the second power supply unit 512 to output, at each of controlled second times, the second electrical power to the control processor 32
(iii) Instruct the third power supply unit 513 to output, at each of controlled third times, the third electrical power to the first malfunction register 33

In addition, at least one of the programs stored in the memory 54 causes the power management controller 52 to serve as a diagnostic processor 52b to monitor
(1) The level of the individual operating voltage of each of the image processor 31 and the control processor 32 outputted from the voltage sensor 38 and received through the second I/O interface 56
(2) The level of the terminal voltage across the battery BT
(3) The level of the individual operating voltage of each component of the power management apparatus 50
(4) The value of the temperature of the power management apparatus 50 measured by the temperature sensor 58

The level of the operating voltage of each of the imaging processor 31 and the control processor 32 can be monitored by, for example, the power management controller 52 without using the voltage sensor 38 in accordance with a corresponding one of the first electrical power and the second electrical power outputted from the power supply module 51.

The at least one of the programs stored in the memory 54 also causes the power management controller 52 to serve as the diagnosis controller 52b to perform a second diagnostic task.

The second diagnostic task communicates with the components 51 to 58 installed in the power management apparatus 50 to thereby diagnose whether there is an operational malfunction in the power management apparatus 50, i.e., in at least one of the components 51 to 58 installed in the power management apparatus 50.

The second diagnostic task diagnoses whether there is a power-supply malfunction of the image processor 31 in accordance with a determination of whether the monitored level of the operating voltage of the image processor 31 lies within a predetermined first normal voltage range or a predetermined first abnormal voltage range that is defined as outside of the first normal voltage range.

The second diagnostic task diagnoses whether there is a power-supply malfunction of the control processor 32 in accordance with a determination of whether the monitored level of the operating voltage of the control processor 32 lies within a predetermined second normal voltage range or a predetermined second abnormal voltage range that is defined as outside of the second normal voltage range.

The second diagnostic task diagnoses whether there is a power-supply malfunction of the battery BT in accordance with a determination of whether the monitored level of the terminal voltage across the battery BT lies within a predetermined normal voltage range defined for the battery BT.

The second diagnostic task diagnoses whether there is a power-supply malfunction of each component of the power management unit 50 in accordance with a determination of whether the monitored level of the operating voltage of the corresponding component of the power management unit 50 lies within a predetermined normal voltage range defined for the corresponding component thereof.

The second diagnostic task diagnoses whether there is a temperature malfunction of the power management apparatus 50 in accordance with a determination of whether the value of the temperature of the power management apparatus 50 lies within a predetermined allowable temperature range.

Each of the first and second normal voltage ranges is for example previously determined to be recommended for the corresponding one of the image processor 31 and the control processor 32. Each of the first and second normal voltage ranges is for example previously determined to be within a recommended voltage range recommended for the SOC 30.

The first abnormal voltage range for the image processor 31 includes an overvoltage range defined to be larger than the upper limit of the first normal voltage range and smaller than or equal to a predetermined rated maximum voltage of the SOC 30, and an undervoltage range defined to be smaller than the lower limit of the first normal voltage range and larger than or equal to a predetermined rated minimum voltage of the SOC 30.

Similarly, the second abnormal voltage range for the control processor 32 includes an overvoltage range defined to be larger than the upper limit of the second normal voltage range and smaller than or equal to a predetermined rated voltage of the SOC 30, and an undervoltage range defined to be smaller than the lower limit of the second normal voltage range and larger than or equal to a predetermined minimum operating voltage of the SOC 30.

If it is determined that there is an operational malfunction in one of the components 51 to 58, the second diagnostic task additionally writes, into the second malfunction register 55, second malfunction data, for example, M-bit flag data (M is a positive integer more than or equal to 2); the M-bit flag data includes information on the operational malfunction in the one of the components 51 to 58.

If it is determined that there is a power-supply malfunction of the image processor 31, the control processor 32, or the battery BT, the second diagnostic task additionally writes, into the second malfunction register 55, the second malfunction data that includes information on the power-supply malfunction of the image processor 31, the control processor 32, or the battery BT.

If it is determined that there is a power-supply malfunction of one of the components 51 to 58, the second diagnostic task additionally writes, into the second malfunction register 55, the second malfunction data that includes information on the power-supply malfunction of the one of the components 51 to 58. If it is determined that there is a temperature malfunction of the power management apparatus 50, the second diagnostic task additionally writes, into the second malfunction register 55, the second malfunction data that includes information on the temperature malfunction of the power management apparatus 50.

Specifically, the second malfunction data (M-bit flag data) is comprised of M bits, and each of the M bits is allocated to a corresponding one of the components of the power management apparatus 50, the power management apparatus 50, the battery BT, the image processor 31, and the control processor 32.

That is, all M bits of the second malfunction data are set to 0, and if determining that there is an operational malfunction in the power supply module 51 has malfunctioned, the second diagnostic task of the power management controller 52 changes a selected one of the M bits of the second malfunction data, which corresponds to the power supply module 51, from 0 to 1, and writes the second malfunction data into the second malfunction register 55. Similarly, if determining that the monitored level of the operating voltage of the image processor 31 lies within the predetermined first abnormal voltage range, the second diagnostic task of the power management controller 52 changes a selected one of the M bits of the second malfunction data, which corresponds to the power management controller 52, from 0 to 1, and writes the second malfunction data into the second malfunction register 55.

Each of the M bits may be allocated to a corresponding one of types of malfunctions, such as the operational malfunction, the power-supply malfunction, and the temperature malfunction.

One or both of the processors 52a and 52b can serve as the power management controller 52. One of the processors 52a and 52b can serve as the power management controller 52 for performing functions each of processors 52a and 52b.

One of the power management controller 52 and the reset controller 57 can perform the functions of each of the power management controller 52 and the reset controller 57.

The second malfunction register 55 installed in the power supply apparatus 50 is configured to store and hold the second malfunction data when the second malfunction data is written thereinto by the power management controller 52. The second malfunction register 55 may be provided as a dedicated register or a general-purpose register. The second malfunction register 55 is comprised of, for example, at least one of various types of volatile memories.

The second I/O interface 56 serves as an interface that enables at least one component of the power management apparatus 50 and the other apparatuses, such as the SOC 30, to communicate with one another therethrough. For example, the normal signal outputted from the WDT 35 is inputted to the power management controller 52 through the second I/O interface 56. The second malfunction data stored in the second malfunction register 55 may be outputted by the second management controller 52 to the storage 40 through the second malfunction register 55 and the SOC 30.

The reset controller 57 is configured to output, to the SOC 30, the reset request signal indicative of a request for resetting of the SOC 30 in response to determination that there is a malfunction in the surroundings monitor system 10.

Specifically, the reset controller 57 performs a reset request task of outputting, to the SOC 30, the reset request signal indicative of a request for resetting of the SOC 30 in response to determination, by the second diagnostic task of the power management controller 52, that there is a malfunction in the power management apparatus 50 or in the surroundings monitor apparatus 20.

Figures 2, 3:
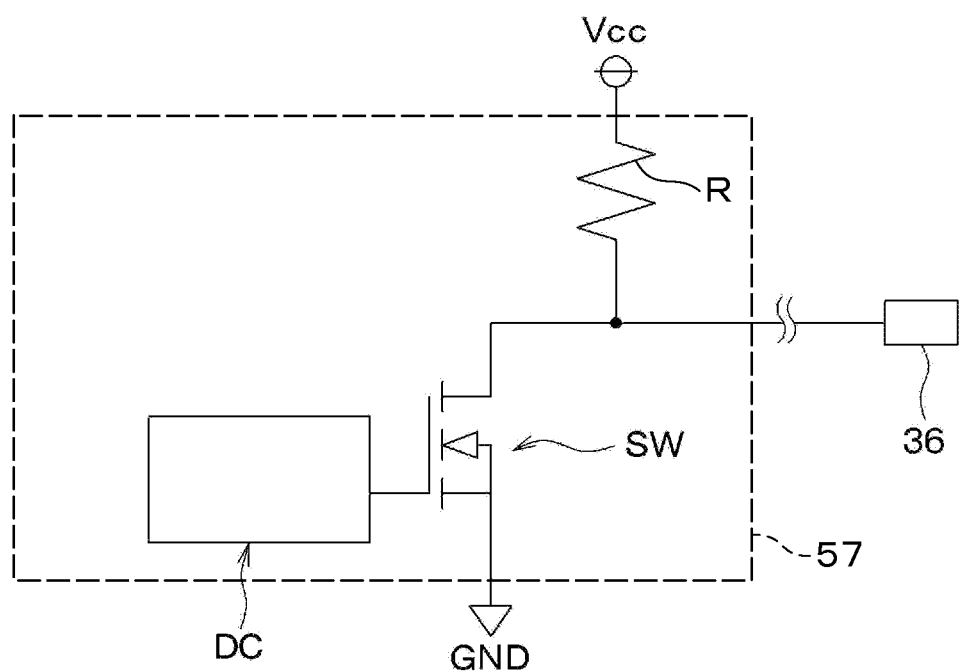
FIG. 2 is a circuit diagram schematically illustrating an example of the configuration of a reset controller illustrated in FIG. 1.
FIG. 3 is a table schematically illustrating how the reset controller works according to the exemplary embodiment.

FIG. 2 schematically illustrates an example of the configuration of the reset controller 57 according to the first embodiment. Referring to FIG. 2, the reset controller 57 includes an open-drain switch SW, i.e., an open-drain NMOSFET SW, a pullup resistor R, and a driver DC. The reset controller 57 may include another type of semiconductor switch other than the open-drain switch.

The open-drain switch SW has drain, source, and gate terminals, which will be referred to as drain, source, and gate. The gate of the open-drain switch SW is connected to the driver DC, and the drain of the open-drain switch SW is connected to a voltage source via the pullup resistor R. As the voltage source, the battery BT or a voltage source installed in the vehicle V can be used. The voltage source has a predetermined potential Vcc, i.e., a predetermined voltage Vcc. The drain of the open-drain switch SW is also connected to the reset terminal 36. The source of the open-drain switch SW is connected to a ground potential.

The driver DC of the reset controller 57 is configured to hold the open-drain switch SW in an off-state as long as there are no malfunctions in the surroundings monitor apparatus 20 and the power management apparatus 50. This causes the open-drain switch SW to output, to the reset terminal 36 of the SOC 30, a high-voltage signal having a potential that is the same as the potential Vcc. The high-voltage signal outputted to the reset terminal 36 of the SOC 30 enables the SOC 30, i.e., the image processor 31 and control processor 32 of the SOC 30, to continuously operate in a normal operation state if each of the image processor 31 and control processor 32 is not in the reset state.

In contrast, the driver DC of the reset controller 57 is configured to switch the open-drain switch SW to an on-state in response to determination, by the diagnostic task of the power management controller 52, that there is a malfunction in the surroundings monitor apparatus 20 and/or the power management apparatus 50. This causes the open-drain switch SW to output, to the reset terminal 36 of the SOC 30, a low-voltage signal having a potential that is the same as the ground potential. The low-voltage signal outputted to the reset terminal 36 of the SOC 30, which serves as the reset request signal, instructs the controller 300 of the SOC 30 to perform the reset task that initializes, for example, the image processor 31, the control processor 32, the first I/O interface 34, and the WDT 35, which have been operating normally, other than the first malfunction register 33 and the storage 37, so that each of the components 31, 32, 34, and 35 is switched to be in the reset state from the normal operation state.

Additionally, the high-voltage signal outputted to the reset terminal 36 of the SOC 30 causes the controller 300 to perform a reset clear task that clears the reset-state components of the SOC 30, i.e., the image processor 31, the control processor 32, the first I/O interface 34, and the WDT 35 if the components 31, 32, 34, and 35 are in the reset state. This switches each of the components 31, 32, 34, and 35 to be in the normal operation state from the reset state.

That is, the high-voltage signal outputted to the reset terminal 36 of the SOC 30 serves as both a normal operation signal and a reset clear signal.

The surroundings monitor system 10 configured set forth above aims to prevent a possibility of the surroundings monitor apparatus 20 outputting erroneous information due to the occurrence of a malfunction in the surroundings monitor apparatus 20 or the power management apparatus 50.

Specifically, the surroundings monitor system 10 is configured to perform control routines for resetting the SOC 30 in response to determination that there is a malfunction in the surroundings monitor apparatus 20 and/or the power management apparatus 50.

The following describes the control routines carried out by the SOC 30 and the power management apparatus 50 with reference to FIGS. 4 to 9.

Figure 4:
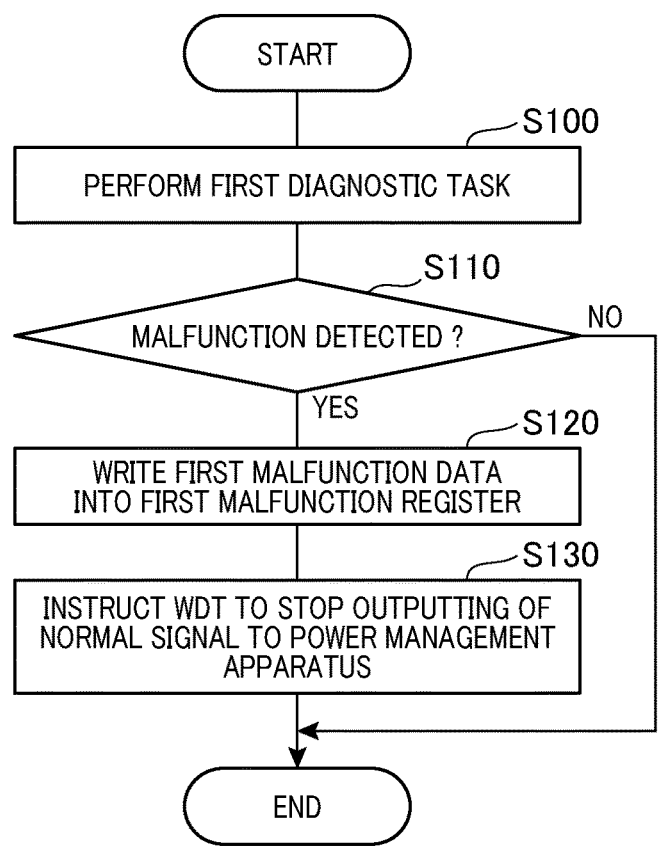
FIG. 4 is a flowchart schematically illustrating an example of a first control routine carried out by a controller of an SOC illustrated in FIG. 1.

FIG. 4 is a flowchart representing a first control routine included in the control routines carried out by the controller 300 of the SOC 30. The controller 300 of the SOC 30 is programmed to periodically or irregularly execute the first control routine during an on state of an ignition switch of the vehicle V.

Referring to FIG. 4, the controller 300 of the SOC 30 performs the first diagnostic task in step S100 to thereby diagnose whether there is a malfunction in the surroundings monitor apparatus 20, i.e., a malfunction in at least one of the components 21, 31 to 38, and 40 installed in the surroundings monitor apparatus 20 in step S110.

In response to determination that there are no malfunctions in the surroundings monitor apparatus 20 (NO in step S110), the controller 300 of the SOC 30 terminates the first control routine.

Otherwise, in response to deter urination that there is a malfunction in the surroundings monitor apparatus 20 (YES in step S110), the controller 300 of the SOC 30 writes, into the first malfunction register 33, the first malfunction data, i.e., N-bit flag data, including information on the malfunctioning at least one of the components of the surroundings monitor apparatus 20 in step S120.

For example, if determining that there is a malfunction in the control processor 32, the controller 300 changes a selected one of the N bits of the first malfunction data, which corresponds to the control processor 32, from 0 to 1, and writes the first malfunction data into the first malfunction register 33 in step S120.

Next, the controller 300 of the SOC 30 instructs the WDT 35 to stop outputting of the normal signal to the power management apparatus 50 in step S130 and thereafter terminates the first control routine.

Figure 5:
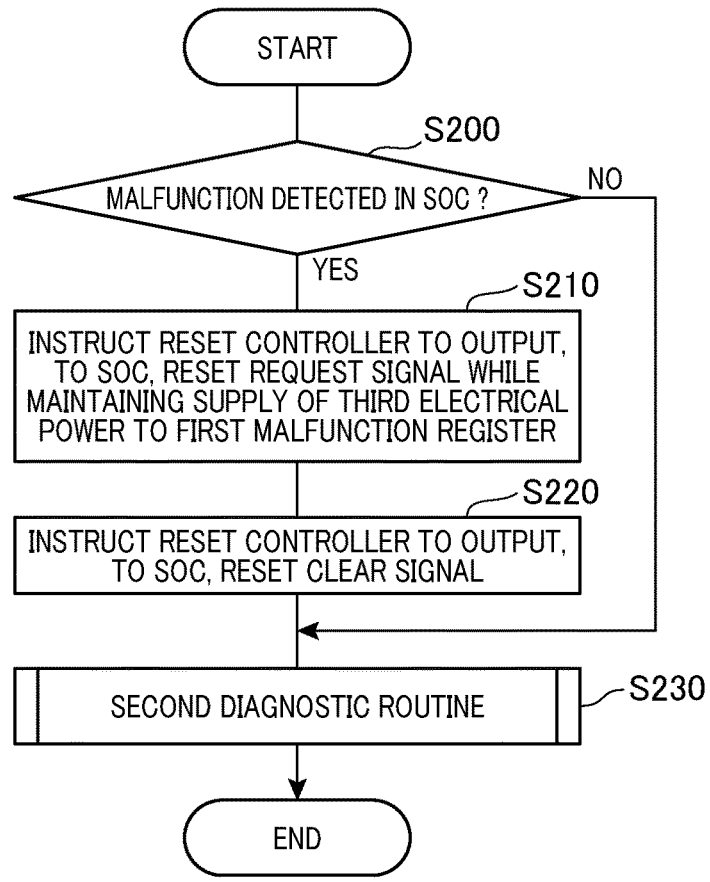
FIG. 5 is a flowchart schematically illustrating an example of a second control routine carried out by a power management processor of a power management apparatus illustrated in FIG. 1.

FIG. 5 is a flowchart representing a second control routine included in the control routines carried out by the power management apparatus 50, i.e., the power management controller 52 of the power management apparatus 50. The power management controller 52 of the power management apparatus 50 is programmed to periodically or irregularly execute the second control routine.

Referring to FIG. 5, the power management controller 52 of the power management apparatus 50 determines whether there is a malfunction in the SOC 30 in step S200. Specifically, the power management controller 52 of the power management apparatus 50 determines that there are no malfunctions in the SOC 30 as long as it is receiving the normal signal outputted from the WDT 35 of the SOC 30, and determines that there is a malfunction in the SOC 30 in response to determination that the power management controller 52 has not received the normal signal for a predetermined threshold period in step S200.

In response to determination that there are no malfunctions in the SOC 30 (NO in step S200), the second control routine proceeds to step S230 while skipping steps S210 and S220.

Otherwise, in response to deter urination that there is a malfunction in the SOC 30 (YES in step S200), the second control routine proceeds to step S210.

In step S210, the power management controller 52 of the power management apparatus 50 instructs the reset controller 57 to output, to the SOC 30, the reset request signal while maintaining, through the power supply module 51, the supply of the first electrical power, the second electrical power, and the third electrical power to the respective image processor 31, control processor 32, and first malfunction register 33 of the SOC 30. Specifically, the power management controller 52 instructs the reset controller 57 to switch the open-drain switch SW to be in the on-state, thus outputting, to the reset terminal 36 of the SOC 30, the low-voltage signal having a potential that is the same as the ground potential in step S210.

Figure 6:
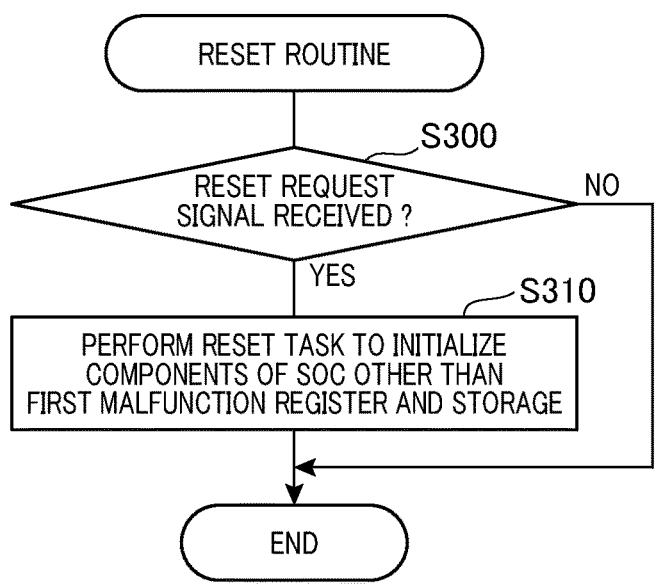
FIG. 6 is a flowchart schematically illustrating an example of a third control routine carried out by the controller of the SOC illustrated in FIG. 1.

FIG. 6 is a flowchart representing a third control routine, i.e., a reset routine, included in the control routines carried out by the SOC 30, i.e., the control processor 32 of the SOC 30. The controller 300 of the SOC 30 is programmed to periodically or continuously execute the third control routine during the on state of the ignition switch of the vehicle V.

Referring to FIG. 6, the controller 300 of the SOC 30 determines whether the controller 300 is receiving the reset request signal, i.e., the low-voltage signal, outputted from the power management apparatus 50 in step S300. In response to determination that the controller 300 is not receiving the reset request signal (NO in step S300), the controller 300 terminates the third control routine.

Otherwise, in response to determination that the controller 300 is receiving the reset request signal outputted from the power management apparatus 50 (YES in step S300), the controller 300 performs the reset task that initializes the image processor 31, the control processor 32, the first I/O interface 34, and the WDT 35 other than the first malfunction register 33 and the storage 37 to thereby switch the components 31, 32, 34, and 35 to be in the reset state while the third electrical power is supplied to the first malfunction register 33, and thereafter the controller 300 terminates the third control routine in step S310.

Because the SOC 30 is reset without the first malfunction register 33 being initialized while the third electrical power is supplied to the first malfunction register 33, the first malfunction data is reliably stored and held in the first malfunction register 33 without being eliminated.

Following the operation in step S210, the power management controller 52 of the power management apparatus 50 instructs the reset controller 57 to output, to the SOC 30, the reset clear signal in step S220. Specifically, the power management controller 52 instructs the reset controller 57 to switch the open-drain switch SW to be in the off-state, thus outputting, to the reset terminal 36 of the SOC 30, the high-voltage signal having a potential that is the same as the potential Vcc in step S220.

Figure 7:
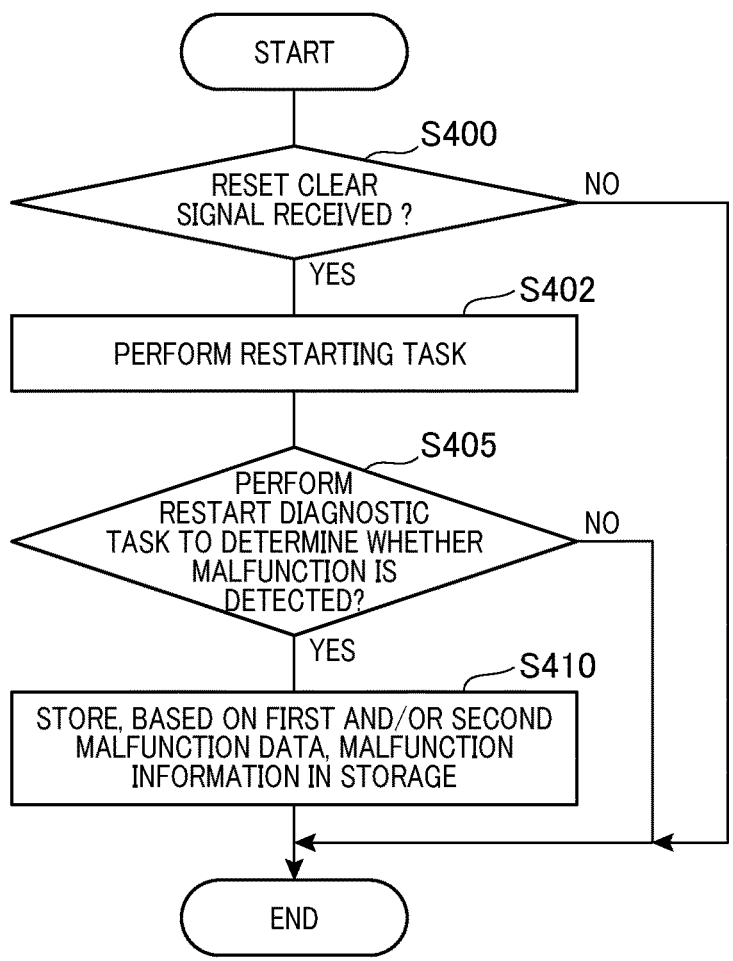
FIG. 7 is a flowchart schematically illustrating an example of a fourth control routine carried out by the controller of the SOC illustrated in FIG. 1.

FIG. 7 is a flowchart representing a fourth control routine included in the control routines carried out by the SOC 30, i.e., the controller 300 of the SOC 30. The controller 300 of the SOC 30 is programmed to periodically or continuously execute the fourth control routine during the on state of the ignition switch of the vehicle V.

Referring to FIG. 7, the controller 300 of the SOC 30 determines whether the control processor 32 is receiving the reset clear signal, i.e., the high-voltage signal, outputted from the power management apparatus 50 in step S400. In response to determination that the controller 300 is not receiving the reset clear signal (NO in step S400), the controller 300 terminates the fourth control routine.

Otherwise, in response to determination that the controller 300 is receiving the reset clear signal outputted from the power management apparatus 50 (YES in step S400), the controller 300 performs the restart task that restarts the reset-state components of the SOC 30, i.e., the image processor 31, the control processor 32, the first I/O interface 34, and the WDT 35 in step S402.

Next, the controller 300 of the SOC 30 performs a restart diagnostic task to thereby diagnose whether a malfunction has occurred in at least one of the surroundings monitor apparatus 20 and the power management apparatus 50 in accordance with individual data stored in each of the first malfunction register 33 and the second malfunction register 55 in step S405.

Specifically, if the first malfunction data, i.e., N-bit flag data, is stored in the first malfunction register 33, the controller 300 identifies, based on the N bits of the first malfunction data, a malfunction having occurred in which of the components of the surroundings monitor apparatus 20 in step S405. The controller 300 can identify, based on the N bits of the first malfunction data, a type of malfunctions having occurred in which of the components of the surroundings monitor apparatus 20 in step S405.

Similarly, if the second malfunction data, i.e., M-bit flag data, is stored in the second malfunction register 55, the controller 300 identifies, based on the M bits of the second malfunction data, a malfunction having occurred in which of the components of the surroundings monitor apparatus 20 and the power management apparatus 50 in step S405. The controller 300 can identify, based on the M bits of the second malfunction data, a type of malfunctions having occurred in which of the components of the components of the surroundings monitor apparatus 20 and the power management apparatus 50 in step S405.

In response to determination that a malfunction has occurred in at least one of the surroundings monitor apparatus 20 and the power management apparatus 50 (YES in step S405), the fourth control routine proceeds to step S410.

In step S410, the controller 300 stores, in the storage 40, malfunction information indicative of at least one malfunctioning component in the surroundings monitor apparatus 20 and the power management apparatus 50 identified by the first malfunction data and/or the second malfunction data in step S405. In step S410, the controller 300 can store, in the storage 40, malfunction information indicative of at least one malfunctioning component in the surroundings monitor apparatus 20 and the power management apparatus 50 and a type of malfunctions having occurred in the at least one malfunctioning component identified by the first malfunction data and/or the second malfunction data in step S405.

Otherwise, in response to determination that no malfunctions have occurred in the surroundings monitor apparatus 20 and the power management apparatus 50 (NO in step S405), the controller 300 terminates the fourth control routine while skipping the operation in step S410.

Following the operation in step S220, the power management controller 52 of the power management apparatus 50 performs the second diagnostic task as a fifth control routine included in the control routines carried out by the power management apparatus 50, i.e., the power management controller 52 of the power management apparatus 50 in step S230.

Figure 8:
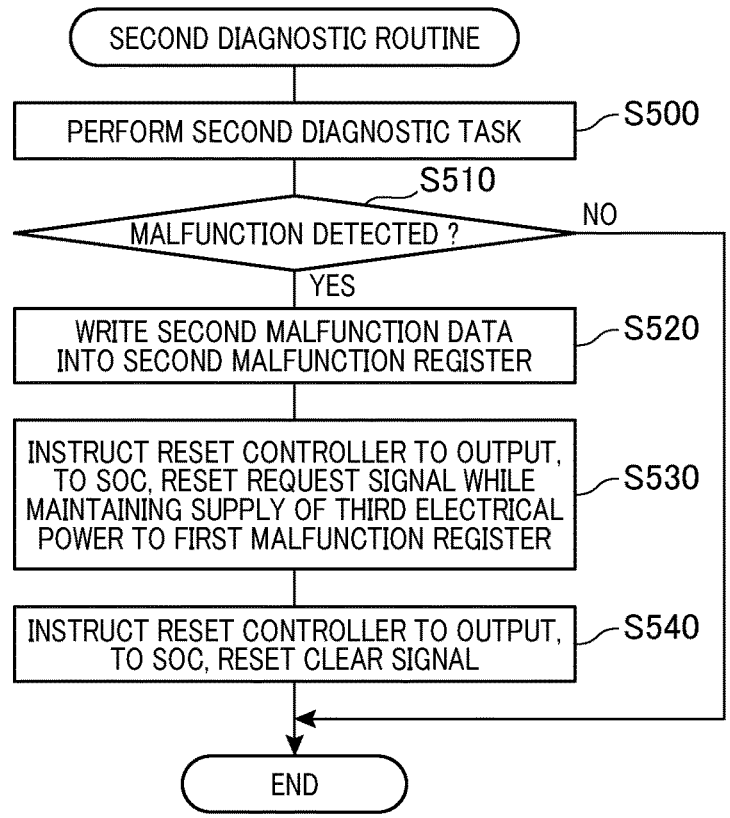
FIG. 8 is a flowchart schematically illustrating an example of a fifth control routine carried out by the power management processor of the power management apparatus illustrated in FIG. 1.

FIG. 8 is a flowchart representing the fifth control routine, i.e., a second diagnostic routine, in the operation of step S230 of the power management controller 52 of the power management apparatus 50.

First, the power management controller 52 performs the second diagnostic task in step S500 to thereby diagnose whether (i) There is an operational malfunction in at least one of the components 51 to 58 installed in the power management apparatus 50

(ii) There is a power-supply malfunction of the image processor 31 in accordance with a determination of whether the monitored level of the operating voltage of the image processor 31 lies within the predetermined first normal voltage range or the predetermined first abnormal voltage range (iii) There is a power-supply malfunction of the control processor 32 in accordance with a determination of whether the monitored level of the operating voltage of the control processor 32 lies within the predetermined second normal voltage range or the predetermined second abnormal voltage range (iv) There is a power-supply malfunction of the battery BT in accordance with a determination of whether the monitored level of the terminal voltage across the battery BT lies within the predetermined normal voltage range (v) There is a power-supply malfunction of each component of the power management unit 50 in accordance with a determination of whether the monitored level of the operating voltage of the corresponding component of the power management unit 50 lies within the predetermined normal voltage range defined for the corresponding component thereof (vi) There is a temperature malfunction of the power management apparatus 50 in accordance with a determination of whether the value of the temperature of the power management apparatus 50 lies within the predetermined allowable temperature range If it is determined by the second diagnostic task that there are no operational malfunctions, power-supply malfunctions, and temperature malfunctions (NO in step S510), the power management controller 52 terminates the fifth control routine.

Otherwise, the fifth control task proceeds to step S520 if it is determined by the second diagnostic task that (i) There is an operational malfunction in at least one of the components 51 to 58

(ii) There is a power-supply malfunction of the image processor 31

(iii) There is a power-supply malfunction of the control processor 32

(iv) There is a power-supply malfunction of the battery BT (v) There is a power-supply malfunction of at least one of the components 51 to 58, or (vi) There is a temperature malfunction of the power management apparatus 50 (YES in step S510)

In step S520, the power management controller 52 writes, into the second malfunction register 55, the second malfunction data, i.e., M-bit flag data, including information on the malfunction having occurred in the power management apparatus 50, the image processor 31, the control processor 32, or the battery BT in step S520.

For example, if it is determined that there is an operational malfunction in one of the components 51 to 58, the second diagnostic task changes a selected one of the M bits of the second malfunction data, which corresponds to the one of the components 51 to 58, from 0 to 1, and writes the second malfunction data into the second malfunction register 55. As another example, if it is determined that there is a power-supply malfunction of the image processor 31, the second diagnostic task changes a selected one of the M bits of the second malfunction data, which corresponds to the image processor 31, from 0 to 1, and writes the second malfunction data into the second malfunction register 55.

Next, the power management controller 52 instructs the reset controller 57 to output, to the SOC 30, the reset request signal while maintaining, through the power supply module 51, the supply of the first electrical power, the second electrical power, and the third electrical power to the respective image processor 31, control processor 32, and first malfunction register 33 of the SOC 30. Specifically, the power management controller 52 instructs the reset controller 57 to switch the open-drain switch SW to be in the on-state, thus outputting, to the reset terminal 36 of the SOC 30, the low-voltage signal having a potential that is the same as the ground potential in step S530. How the controller 300 of the SOC 30 performs the reset task in response to receiving the reset request signal, i.e., the low-voltage signal, has been already described with reference to FIG. 6.

Following the operation in step S530, the power management controller 52 instructs the reset controller 57 to output, to the SOC 30, the reset clear signal in step S540. Specifically, the power management controller 52 instructs the reset controller 57 to switch the open-drain switch SW to be in the off-state, thus outputting, to the reset terminal 36 of the SOC 30, the high-voltage signal in step S540, and thereafter, terminates the fifth control routine, i.e., the second diagnostic task, in step S230. How the controller 300 of the SOC 30 performs the restart task in response to receiving the reset clear signal, i.e., the high-voltage signal has been already described with reference to FIG. 7.

As described in detail above, the surroundings monitor system 10 according to the exemplary embodiment is configured to reset selected components of the SOC 30 other than the first malfunction register 33 and the storage 37 in response to determination that there is a malfunction in at least one of the surroundings monitor apparatus 20 and the power management apparatus 50, and thereafter the reset-state components of the SOC 30 while at least one of first malfunction data and second malfunction data indicative of the occurred malfunction is held in at least one of the first malfunction register 33 and the second malfunction register 55.

This configuration therefore makes it possible to reliably detect the occurrence of the malfunction after the restart of the reset-state components of the SOC 30.

Specifically, in response to determination that there is a malfunction in the surroundings monitor apparatus 20, the controller 300 of the SOC 30 is configured to store, in the first malfunction register 33, first malfunction data indicative of the occurred malfunction.

This configuration reduces a time required for the controller 300 to restart the reset-state components of the SOC 30 as compared with a case where the controller 300 stores the first malfunction data in an external memory, such as the storage 40, and thereafter restarts itself. This therefore reduces a possibility of the surroundings monitor apparatus 20 outputting erroneous information about the surrounding of the vehicle V. The outputting of the erroneous information about the surrounding of the vehicle would result in a possibility of a malfunction operation, such as erroneous sudden braking, of the vehicle V occurring.

Accordingly, the surroundings monitor system 10 according to the exemplary embodiment makes it possible to reliably diagnose that a malfunction has occurred therein while reducing a possibility of the surroundings monitor apparatus 20 outputting erroneous information about the surrounding of the vehicle V.

The surroundings monitor system 10 according to the exemplary embodiment additionally offers the following advantageous benefits.

When restarting from the reset state, the controller 300 of the SOC 30 is configured to perform the restart diagnostic task to thereby diagnose whether a malfunction has occurred in at least one of the surroundings monitor apparatus 20 and the power management apparatus 50 in accordance with individual data stored in each of the first malfunction register 33 and the second malfunction register 55.

This configuration reduces a time required for the controller 300 to restart the reset-state components of the SOC 30 as compared with a case where the controller 300 determines whether a malfunction has occurred in, for example, the surroundings monitor apparatus 20, and thereafter restarts the components of the SOC 30.

When a result of the restart diagnostic task represents the occurrence of a malfunction in at least one of the surroundings monitor apparatus 20 and the power management apparatus 50, the controller 300 of the SOC 30 is configured to store, in the storage 40, the result of the restart diagnostic task as malfunction information. Otherwise, when a result of the restart diagnostic task represents no occurrence of a malfunction in at least one of the surroundings monitor apparatus 20 and the power management apparatus 50, the controller 300 of the SOC 30 is configured not to store, in the storage 40, the result of the restart diagnostic task.

This configuration reduces the number of times that the controller 300 stores, i.e., writes, information into the storage 40, making it possible to reduce a possibility of the occurrence of poor retention of the storage 40.

In response to determining that a reset condition indicative of the occurrence of a malfunction in at least one of the SOC 30 and the power management apparatus 50 is satisfied, the power management controller 52 of the power management apparatus 50 is configured to perform the reset task for the SOC 30 while maintaining power supply to the SOC 30, i.e., at least the first malfunction register 33, so that the first malfunction data indicative of the occurrence of a malfunction stored in the first malfunction register 33 is reliably held. This configuration prevents the first malfunction register 33 from being erased when the SOC 30 is reset and thereafter restarted.

Each of the first and second malfunction registers 33 and 55 is comprised of, for example, at least one of various types of volatile memories; these volatile memories are cheaper in cost and simpler in circuit structure than non-volatile memories. This results in the surroundings monitor apparatus 20 having a lower manufacturing cost.

The power management controller 52 of the power management apparatus 50 is configured to output, to the reset terminal 36 of the SOC 30, the reset request signal indicative of a request for resetting of the SOC 30 in response to determination that there is at least one of a temperature malfunction in the power management apparatus 50 and a power-supply malfunction of the image processor 31, the control processor 32, the battery BT, or one of the components of the power management apparatus 50. In response to receiving the reset request signal, the controller 300 of the SOC 30 performs the reset task to thereby initialize the image processor 31, the control processor 32, the first I/O interface 34, and the WDT 35 of the SOC 30 other than the first malfunction register 33 and the storage 37. This therefore enables the SOC 30 to recover from the occurred malfunction as immediately as possible.

The surroundings monitor apparatus 20 is designed as a camera module comprised of the vehicular camera 21 for capturing images of the surrounding of the vehicle V. The SOC 30 serves as an image processing apparatus that performs various tasks using the images captured by the vehicular camera 21 to thereby retrieve various information items around the vehicle V. For this reason, the SOC 30, i.e., the image processing apparatus, is an important apparatus required to perform assistance of driver's maneuvers of the vehicle V or autonomous driving of the vehicle V.

Accordingly, the surroundings monitor system 10, which reduces a possibility of the surroundings monitor apparatus 20 outputting erroneous information about the surrounding of the vehicle V, contributes significantly to improvement of the reliability of assistance of driver's maneuvers of the vehicle V or autonomous driving of the vehicle V.

Figure 9:
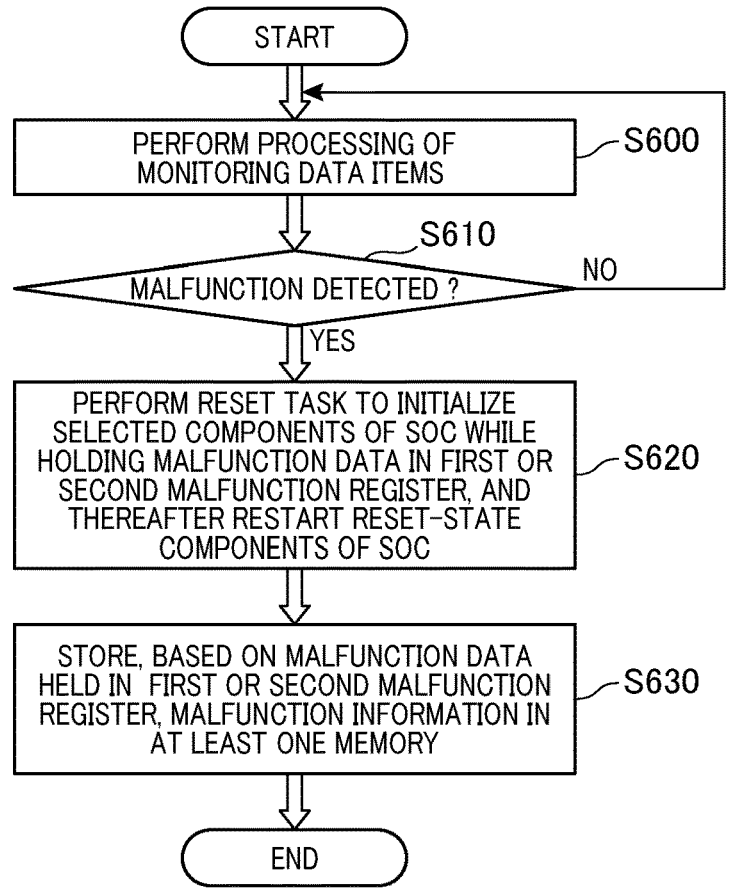
FIG. 9 is a flowchart schematically illustrating an example of a monitoring-data processing method carried out by at least one processor installed in the surroundings monitor system.

For example, at least one processor, such as the controller 300, i.e., the image processor 31 or the control processor 32, or the power management controller 52, such as the power management processor 52a or the diagnostic processor 52b installed in the surroundings monitor system 10 is programmed to perform a monitoring-data processing method illustrated in FIG. 9 during the on state of an ignition switch of the vehicle V.

Referring to FIG. 9, the at least one processor performs processing of monitoring data items, such as images, captured by the surroundings monitor apparatus 20 in step S600.

Next, the at least one processor determines whether there is a malfunction in at least one of the surroundings monitor apparatus 20 and the power management apparatus 50 of the surroundings monitor system 10 in step S610, which is similar to the operations in step S200 of FIG. 4 or steps S500 and S510 of FIG. 8.

In response to determination that there are no malfunctions in each of the surroundings monitor apparatus 20 and the power management apparatus 50 of the surroundings monitor system 10 (NO in step S610), the at least one processor repeats the operation in step S600.

Otherwise, in response to deter urination that there is a malfunction in at least one of the surroundings monitor apparatus 20 and the power management apparatus 50 of the surroundings monitor system 10 (YES in step S610), the at least one processor performs the reset task that initializes the SOC 30, i.e., selected components of the SOC 30, while holding malfunction data indicative of the occurred malfunction in for example, the first malfunction register 33 or the second malfunction register 55, and thereafter restarts the reset-state SOC 30, i.e., the reset-state components of the SOC 30 in step S620.

Following the operation in step S620, the at least one processor stores, based on the malfunction data held in the first or second malfunction register 33 or 55, malfunction information indicative of the occurred malfunction in at least one memory installed in the surroundings monitor system 10, such as the storage 40, in step S630. and thereafter terminates the monitoring-data processing method.

The monitoring-data processing method reduces a time required for the at least one processor to restart the reset-state components of the SOC 30 as compared with a case where the at least one processor stores malfunction information in an external memory, such as the storage 40, and thereafter restarts itself. This therefore reduces a possibility of the surroundings monitor apparatus 20 outputting erroneous information about the surrounding of the vehicle V. The outputting of the erroneous information about the surrounding of the vehicle would result in a possibility of a malfunction operation, such as erroneous sudden braking, of the vehicle V occurring.

Modifications

The present disclosure is not limited to the exemplary embodiment set forth above, and can be variously modified for example as follows.

The power management controller 52 of the power management apparatus 50 is configured to output, to the reset terminal 36 of the SOC 30, the low-voltage signal as the reset request signal, so that the controller 300 of the SOC 30 performs the reset task in response to receiving the reset request signal. In addition, the power management controller 52 of the power management apparatus 50 is configured to output, to the reset terminal 36 of the SOC 30, the high-voltage signal as the reset clear signal, so that the controller 300 of the SOC 30 performs the restart task in response to receiving the reset clear signal. The present disclosure is however not limited to the above configuration of the controller 300 and the power management controller 52.

Specifically, the power management controller 52 of the power management apparatus 50 can be configured to output, to the reset terminal 36 of the SOC 30, the low-voltage signal as the reset request signal, so that the controller 300 of the SOC 30 can perform the reset task in response to receiving the reset request signal, and thereafter perform the resetting task without receiving the reset clear signal, that is, without the power management controller 52 outputting the reset clear signal. In other words, the reset request signal according to this modification serves as an instruction for the controller 300 to reset the SOC 30 and thereafter restart the SOC 30.

The controller 300 of the surroundings monitor apparatus 20 is comprised of the image processor 31 and the control processor 32 mounted on a single semiconductor chip as a part of the SOC 30, but the present disclosure is not limited thereto. Specifically, the controller 300 of the surroundings monitor apparatus 20 can be comprised of the image processor 31 and the control processor 32 mounted on respective different semiconductor chips. The WDT 35 can be mounted on a semiconductor chip different from the SOC 30.

The power management controller 52 of the power management apparatus 50 is comprised of the power management processor 52a and the diagnostic processor 52b mounted on a single semiconductor chip as a part of the power management apparatus 50, but the present disclosure is not limited thereto. Specifically, the power management controller 52 of the power management apparatus 50 can be comprised of the power management processor 52a and the diagnostic processor 52b mounted on respective different semiconductor chips.

After restarting based on the restart task, the controller 300 of the SOC 30 according to the exemplary embodiment is preferably configured to perform the restart diagnostic task to thereby diagnose whether a malfunction has occurred in at least one of the surroundings monitor apparatus 20 and the power management apparatus 50 in accordance with individual data stored in each of the first malfunction register 33 and the second malfunction register 55, but the present disclosure is not limited thereto. Specifically, after restarting based on the restart task, the controller 300 of the SOC 30 according to the exemplary embodiment can be configured not to perform the restart diagnostic task.

When a result of the restart diagnostic task represents no occurrence of a malfunction in at least one of the surroundings monitor apparatus 20 and the power management apparatus 50, the controller 300 of the SOC 30 is configured not to store, in the storage 40, the result of the restart diagnostic task, but can be configured to store, in the storage 40, the result of the restart diagnostic task.

Each of the first and second malfunction registers 33 and 55 is comprised of a volatile memory, but can be comprised of a nonvolatile memory. If each of the first and second malfunction registers 33 and 55 is comprised of a volatile memory and a malfunction has occurred in the surroundings monitor apparatus 20, the first malfunction data is stored in the first malfunction register 33 at the resetting of the SOC 30 although power supply from the power management apparatus 50 to the SOC 30 is temporarily stopped. If each of the first and second malfunction registers 33 and 55 is comprised of a volatile memory, the power management controller 52 of the power management apparatus 50 can be configured to temporarily stop power supply from the power supply module 51 to the SOC 30.

At least one processor, such as the controller 300, i.e., the image processor 31 or the control processor 32, or the power management controller 52, installed in the surroundings monitor system 10 is configured to perform the reset task that initializes the SOC 30, i.e., selected components of the SOC 30, in response to determination that there is a malfunction in at least one of the surroundings monitor apparatus 20 and the power management apparatus 50 of the surroundings monitor system 10. The present disclosure is however not limited to this configuration.

Specifically, at least one processor installed in the surroundings monitor system 10 can be configured to perform the reset task that initializes the SOC 30, i.e., selected components of the SOC 30, in response to determination that there is a malfunction in only the surroundings monitor apparatus 20.

The power management controller 52 of the power management apparatus 50 is configured to determine whether there is a malfunction in the controller 300 of the SOC 30 through communications with the WDT 35 of the SOC 30, but the present disclosure is not limited thereto. Specifically, the power management controller 52 of the power management apparatus 50 can be configured to determine whether there is a malfunction in the controller 300 of the SOC 30 through one of measures, such as communications with the controller 300 of the SOC 30, other than the communications with the WDT 35 of the SOC 30.

The monitoring-data processing system according to one aspect of the present disclosure is applied to the surroundings monitor system 10 for monitoring the surrounding of the vehicle V using the vehicular camera 21, but can be applied to another surroundings monitor system for monitoring the surrounding of the vehicle V using another sensor device, such as a light detection ranging device (LiDAR) that uses millimeter radars or infrared radiation for capturing information around the vehicle V.

One or more components in the exemplary embodiment are not necessarily essential components except that (i) one or more components that are described as one or more essential components or (ii) one or more components that are principally essential.

Specific values disclosed in the exemplary embodiment, each of which represents the number of components, a physical quantity, and/or a range of a physical parameter, are not limited thereto except that (i) the specific values are obviously essential or (ii) the specific values are essential in principle.

The specific function or configuration of each component described in the exemplary embodiment is not limited thereto except that (1) the specific function or configuration is described to be essential or (2) the specific function or configuration is required in principle. Similarly, the specific structural or functional relationship between components described in the exemplary embodiment is not limited thereto except that (1) the specific structural or functional relationship is described to be essential or (2) the specific structural or functional relationship is required in principle.

The controller 300 and the power management controller 52 and methods performed by the controller 300 and the power management controller 52 described in the present disclosure can be implemented by a dedicated computer including a memory and a processor programmed to perform one or more functions embodied by one or more computer programs.

The controller 300 and the power management controller 52 and methods performed by the controller 300 and the power management controller 52 described in the present disclosure can also be implemented by a dedicated computer including a processor comprised of one or more dedicated hardware logic circuits.

The controller 300 and the power management controller 52 and methods performed by the controller 300 and the power management controller 52 described in the present disclosure can further be implemented by at least one dedicated computer comprised of a memory, a processor programmed to perform one or more functions embodied by one or more computer programs, and one or more hardware logic circuits.

The programs described in the present disclosure can be stored in a computer-readable non-transitory storage medium as instructions executable by a computer and/or a processor.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A monitoring-data processing system comprising:
a monitor control apparatus that includes a first controller, the first controller being configured to retrieve monitoring data indicative of surroundings of a vehicle captured by a surroundings monitor; and
a power supply apparatus including a second controller and configured to power the monitor control apparatus,
at least the monitor control apparatus including an internal register provided therein,
at least one of the first controller and the second controller being configured to determine whether there is a malfunction in at least one of the monitor control apparatus, the surroundings monitor, and the power supply apparatus,
the first controller being configured to:
write, in response to a malfunction determination that there is a malfunction in at least one of the monitor control apparatus, the surroundings monitor, and the power supply apparatus, malfunction data indicative of the malfunction into the internal register; and
perform a reset task of switching the monitor control apparatus to be in a reset state in response to the malfunction determination while holding the malfunction data in the internal register, wherein:
the first controller of the monitor control apparatus is configured to:
perform a restart task of restarting the monitor control apparatus that is in the reset state, so that the monitor control apparatus including the first controller is restarted; and
perform, after being restarted, a restart determination task of determining, based on data stored in the internal register, whether at least one of the monitor control apparatus, the surroundings monitor, and the power supply apparatus has malfunctioned.

2. The monitoring-data processing system according to claim 1, further comprising:
a storage comprised of a nonvolatile memory,
wherein:
the first controller of the monitor control apparatus is configured to store, in response to a first determination that at least one of the monitor control apparatus, the surroundings monitor, and the power supply apparatus has malfunctioned, malfunction information in the storage, the malfunction information representing at least one malfunctioning apparatus selected from the monitor control apparatus, the surroundings monitor, and the power supply apparatus; and
the first controller of the monitor control apparatus is configured not to store, in response to a second determination that none of the monitor control apparatus, the surroundings monitor, and the power supply apparatus has malfunctioned, a result of the second determination in the storage.

3. The monitoring-data processing system according to claim 1, wherein:
the power supply apparatus is configured to continuously power the monitor control apparatus independently of whether there is a malfunction in at least one of the monitor control apparatus, the surroundings monitor, and the power supply apparatus; and
the first controller of the monitor control apparatus is configured to perform the reset task in response to a reset condition being satisfied while the monitor control apparatus is continuously powered by the power supply apparatus.

4. The monitoring-data processing system according to claim 1, wherein:
the internal register is comprised of a volatile memory;
the power supply apparatus is configured to continuously supply electrical power to at least the internal register of the monitor control apparatus independently of whether there is a malfunction in at least one of the monitor control apparatus, the surroundings monitor, and the power supply apparatus; and
the first controller of the monitor control apparatus is configured to perform the reset task in response to a reset condition being satisfied while the electrical power is supplied from the power supply apparatus to at least the internal register of the monitor control apparatus.

5. A monitoring-data processing system comprising:
a monitor control apparatus that includes a first controller, the first controller being configured to retrieve monitoring data indicative of surroundings of a vehicle captured by a surroundings monitor; and
a power supply apparatus including a second controller and configured to power the monitor control apparatus,
at least the monitor control apparatus including an internal register provided therein,
at least one of the first controller and the second controller being configured to determine whether there is a malfunction in at least one of the monitor control apparatus, the surroundings monitor, and the power supply apparatus,
the first controller being configured to:
  write, in response to a malfunction determination that there is a malfunction in at least one of the monitor control apparatus, the surroundings monitor, and the power supply apparatus, malfunction data indicative of the malfunction into the internal register; and
  perform a reset task of switching the monitor control apparatus to be in a reset state in response to the malfunction determination while holding the malfunction data in the internal register,
wherein:
the internal register is comprised of a nonvolatile memory; and
the first controller of the monitor control apparatus is configured to perform the reset task in response to a reset condition being satisfied even if the monitor control apparatus is temporarily not powered by the power supply apparatus.

6. A monitoring-data processing system comprising:
a monitor control apparatus that includes a first controller, the first controller being configured to retrieve monitoring data indicative of surroundings of a vehicle captured by a surroundings monitor; and
a power supply apparatus including a second controller and configured to power the monitor control apparatus,
at least the monitor control apparatus including an internal register provided therein,
at least one of the first controller and the second controller being configured to determine whether there is a malfunction in at least one of the monitor control apparatus, the surroundings monitor, and the power supply apparatus,
the first controller being configured to:
  write, in response to a malfunction determination that there is a malfunction in at least one of the monitor control apparatus, the surroundings monitor, and the power supply apparatus, malfunction data indicative of the malfunction into the internal register; and
  perform a reset task of switching the monitor control apparatus to be in a reset state in response to the malfunction determination while holding the malfunction data in the internal register, wherein:
the second controller of the power supply apparatus is configured to:
  determine whether there is a malfunction in the power supply apparatus; and
  output a reset request signal to the first controller of the power supply apparatus in response to determining that there is a malfunction in the power supply apparatus; and
the first controller of the monitor control apparatus is configured to perform the reset task of switching the monitor control apparatus to be in the reset state in response to receiving the reset request signal.

7. A monitoring-data processing system comprising:
a monitor control apparatus that includes a first controller, the first controller being configured to retrieve monitoring data indicative of surroundings of a vehicle captured by a surroundings monitor; and
a power supply apparatus including a second controller and configured to power the monitor control apparatus,
at least the monitor control apparatus including an internal register provided therein,
at least one of the first controller and the second controller being configured to determine whether there is a malfunction in at least one of the monitor control apparatus, the surroundings monitor, and the power supply apparatus,
the first controller being configured to:
  write, in response to a malfunction determination that there is a malfunction in at least one of the monitor control apparatus, the surroundings monitor, and the power supply apparatus, malfunction data indicative of the malfunction into the internal register; and
  perform a reset task of switching the monitor control apparatus to be in a reset state in response to the malfunction determination while holding the malfunction data in the internal register, wherein:
the monitor control apparatus comprises a watchdog timer configured to monitor whether the first controller of the monitor control apparatus is operating normally; and
the second controller of the power supply apparatus is configured to:
  communicate with the watchdog timer to accordingly determine whether there is a malfunction in the first controller of the monitor control apparatus; and
  output a reset request signal to the first controller of the monitor control apparatus in response to determining that there is a malfunction in the first controller of the monitor control apparatus; and
the first controller of the monitor control apparatus is configured to perform the reset task of switching the monitor control apparatus to be in the reset state in response to receiving the reset request signal.

8. The monitoring-data processing system according to claim 1, wherein:
the monitor control apparatus is configured as an image processing apparatus that performs processing of an image around the vehicle as the monitor data, the image being captured by the surroundings monitor.

9. A monitoring-data processing system comprising:
a monitor control apparatus that includes a first controller, the first controller being configured to retrieve monitoring data indicative of surroundings of a vehicle captured by a surroundings monitor; and
a power supply apparatus including a second controller and configured to power the monitor control apparatus,
at least the monitor control apparatus including an internal register provided therein,
at least one of the first controller and the second controller being configured to determine whether there is a malfunction in at least one of the monitor control apparatus, the surroundings monitor, and the power supply apparatus,
the first controller being configured to:
  write, in response to a malfunction determination that there is a malfunction in at least one of the monitor control apparatus, the surroundings monitor, and the power supply apparatus, malfunction data indicative of the malfunction into the internal register; and perform a reset task of switching the monitor control apparatus to be in a reset state in response to the malfunction determination while holding the malfunction data in the internal register, wherein the second controller of the power supply apparatus is configured to supply electrical power to the first controller of the monitor control apparatus, so that the first controller is operating at an operating voltage based on the supplied electrical power, the monitoring-data processing system further comprising a measuring unit configured to measure the operating voltage of the first controller, the second controller of the power supply apparatus being configured to:

(i) monitor a level of the operating voltage measured by the measuring unit;

(ii) perform a first determination of whether an operational malfunction has occurred in the power supply apparatus, and a second determination of whether the monitored level of the operating voltage of the first controller lies within a predetermined normal voltage range to thereby determine whether a power-supply malfunction of the first controller has occurred; and (iii) output a reset request signal to the first controller of the power supply apparatus in response to determining that the operational malfunction has occurred in the power supply apparatus or the power-supply malfunction of the first controller has occurred, the first controller of the monitor control apparatus being configured to perform the reset task of switching the monitor control apparatus in response to receiving the reset request signal.

10. The monitoring-data processing system according to claim 9, wherein:

the internal register of the monitor control apparatus is a first internal register;

the power supply apparatus includes a second internal register provided therein; and the second controller of the power supply apparatus is configured to write, in response to determining that the operational malfunction has occurred in the power supply apparatus or the power-supply malfunction of the first controller has occurred, second malfunction data indicative of the operational malfunction or the power-supply malfunction into the second internal register.

11. A monitoring-data processing method executable by at least one processor included in a monitoring-data processing system that includes a control apparatus that retrieves monitoring data indicative of surroundings of a vehicle, the monitoring-data processing method comprising:

performing processing of the monitoring data retrieved by the control apparatus;

determining whether there is a malfunction in the monitoring-data processing system; and performing, in response to a malfunction determination that there is a malfunction in the monitoring-data processing system, a task of switching the control apparatus to be in a reset state and thereafter restarting the control apparatus while holding data indicative of the malfunction in an internal storage of the control apparatus;

performing a restart task of restarting the control apparatus that is in the reset state so that the control apparatus is restarted; and performing, after being restarted, a restart determination task of determining, based on data stored in the internal storage, whether the monitoring-data processing system has malfunctioned.

* * * * *